(12) United States Patent  
Womer et al.

(10) Patent No.: US 6,497,508 B1  
(45) Date of Patent: Dec. 24, 2002

(54) PLASTICATING PROCESS, APPARATUS AND SCREW WITH MIXING

(75) Inventors: Timothy W. Womer, Edinburg, PA (US); Walter S. Smith, New Castle, PA (US); Rosalyn M. Thompson, Youngstown, OH (US)

(73) Assignee: New Castle Industries, Inc., New Castle, PA (US)

(*) Notice: Subject to any disclaimer, the term of this patent is extended or adjusted under 35 U.S.C. 154(b) by 35 days.

(21) Appl. No.: 09/882,948

(22) Filed: Jun. 15, 2001

(51) Int. Cl.[7] ................................................. B29B 7/42
(52) U.S. Cl. ............................ 366/81; 366/88; 366/90
(58) Field of Search .............................. 366/81, 83–85, 366/88–90, 319, 321, 324; 425/204, 208, 209

(56) References Cited

U.S. PATENT DOCUMENTS

| 2,753,595 | A | | 7/1956 | Dulmage |
| 3,006,029 | A | | 10/1961 | Saxton |
| 3,486,192 | A | | 12/1969 | Le Roy |
| 3,524,222 | A | | 8/1970 | Gregory et al. |
| 3,652,064 | A | | 3/1972 | Lehnen et al. |
| 3,941,535 | A | | 3/1976 | Street |
| 4,085,461 | A | | 4/1978 | Maillefer |
| 4,201,481 | A | | 5/1980 | Iddon et al. |
| 4,215,978 | A | | 8/1980 | Takayama et al. |
| 4,227,870 | A | | 10/1980 | Kim |
| 4,277,182 | A | | 7/1981 | Kruder |
| 4,405,239 | A | | 9/1983 | Chung et al. |
| 4,639,143 | A | * | 1/1987 | Frankland, Jr. |
| 4,752,136 | A | | 6/1988 | Colby |
| 4,840,492 | A | * | 6/1989 | Nakamura |
| 5,064,293 | A | * | 11/1991 | Nakamura |
| 5,215,764 | A | | 6/1993 | Davis et al. |
| 5,318,357 | A | * | 6/1994 | Colby et al. |
| 5,318,358 | A | * | 6/1994 | Wobbe et al. |
| 5,798,077 | A | * | 8/1998 | Womer et al. |
| 5,816,698 | A | | 10/1998 | Durina et al. |
| 6,227,692 | B1 | * | 5/2001 | Heathe |

FOREIGN PATENT DOCUMENTS

JP 5-228920 * 9/1993

* cited by examiner

Primary Examiner—Charles E. Cooley  
(74) Attorney, Agent, or Firm—Robert J. Herberger

(57) ABSTRACT

A cylindrical apparatus or module to be included in a screw of a plasticating device. The screw has a helical flight disposed within and cooperating with the inner-wall of a heated barrel to form an upstream where material is fed into and a downstream where material exits the device. The cylindrical module has a helical channel traversing in a reverse helical direction compared with the direction of the flight. Input grooves extend in the surface of the module with input groove openings beginning within the helical channel and terminating in a dead end before intersecting the channel upstream. Output grooves, being adjacent to the input grooves, extend in the surface of the module with output groove openings beginning within the helical channel and terminating in a dead end before intersecting the channel downstream. A barrier is between the pair of adjacent input and output grooves to prevent direct communication therebetween.

12 Claims, 3 Drawing Sheets

PLASTICATING PROCESS, APPARATUS AND SCREW WITH MIXING

FIELD OF INVENTION

This invention relates to extruders and injection machines of the type in which a screw rotatable within a barrel is employed to extrude or inject molten resinous material downstream to an outlet port of the barrel. More particularly, this invention is concerned with thorough mixing and melting of resinous material using a special cylindrical apparatus in the screw arrangement.

BACKGROUND OF THE INVENTION

A plasticating device or unit commonly used today receives polymer or thermoplastic resin pellets, granules or powders, then heats and works the resin to convert it into a melted or molten state. The melt or molten material is delivered under pressure through a restricted outlet or discharge port to make the finished article. It is desirable that the molten material or extrudate leaving the plasticating device be homogeneously mixed, completely melted, and uniform in temperature, viscosity, color and composition.

More specifically, the basic plasticating device includes an elongated cylindrical barrel which is heated at various locations along its length. A screw extends longitudinally through the barrel. The screw has a core with a helical flight thereon and the flight cooperates with the cylindrical inner surface of the barrel to define a helical valley for forward passage of the resin to the plasticating device outlet port.

Since there are several different types of thermoplastic resins or polymers, and with each having different physical properties and characteristics, there are different screw configurations. In general, however, the typical plasticating screw has a plurality of sections along its extended axis with each section being designed for a particular function. Ordinarily, there is a feed section, a transition section and a metering section in series.

The feed section extends forward from a feed opening where solid thermoplastic resins, in pellet, granular or powder form, are introduced into the plasticating unit and pushed forward by the screw along the inside of the barrel. The resin is then worked and heated in the transition section so that melting occurs. After approximately 40 to 80 percent of the resin has been melted, solid bed breakup occurs, and solids become randomly dispersed within the melt. It is important to note that most melting initially occurring in the transition section takes place at or near the heat source of the barrel. Then, melting becomes enhances as solids subsequently become dispersed within the melt. To assure a homogeneous melt, therefore, it is important that the transition section enhances turbulent flow, as opposed to laminar flow, so that all the resin comes within the heating vicinity of the barrel or is dispersed within the melt. Otherwise, the presence of minute unmelted resin particles will appear in the finished article.

The transition section has a reduced root depth of the helical passageway, as compared with the feed section, to reflect the volume reduction due to melting of the feed. The transition section leads to the metering section. The metering section, as one of its intended functions, provides a constant flow of molten material toward the outlet port. In addition, it is important that the metering section melt any unmelted solids and mix and maintain the molten resin in a homogeneous and uniform composite.

As described in U.S. Pat. No. 3,486,192, controlled melting and mixing of thermoplastic materials can be enhanced with a special cylindrical or tapered cylindrical shearing means in the transition section of the plasticating screw arrangement. Input grooves are arranged to extend substantially longitudinally in the surface of the special module or section with groove openings at the input and that terminate in dead ends before reaching the output end of the section. Output grooves are also arranged between the input grooves extend substantially longitudinally in the surface of the special section with openings at the output end and which terminate in dead ends before reaching the input end of the section. As explained in U.S. Pat. No. 3,486,192 to Le Roy, as the special section rotates, plastic material is fed under pressure from a prior stage into and along the input grooves before shearing over lands between the grooves and passing into the output grooves, through the output openings and into the next conveyor stage.

Although this configuration may satisfy many general needs, thermal and chaotic mixing can be improved even more for various thermoplastic resin and polymer materials by having a special cylindrical or tapered cylindrical shearing module that allows for a continuous back flow of molten material. The back flow of molten material gets recycled through portions of the transition section and is remixed with newly advancing molten resin, thereby further assuring the uniformity of the composition, viscosity, color and temperature of the molten resin leaving the plasticating device.

SUMMARY OF THE INVENTION

The present invention is directed to an improvement in the screw configuration, plasticating device and method for improving mixing and melting of resin material by a screw having a helical flight disposed within and cooperating with the inner-wall of a heated barrel to form an upstream where material is fed into and a downstream where material exits the device. In accordance with this invention, a special cylindrical module is included in the screw arrangement. The cylindrical module of the instant invention comprises a helically cut channel traversing in a reverse helical direction compared with the forward flow direction caused by the flight in the prior downstream stage. With this invention, a plurality of discrete grooves are arranged in a discontinuous helix cut.

More specifically, this invention includes input grooves extending in the surface of the cylindrical module with input groove openings beginning within the helically cut channel and terminating in a dead end before intersecting the immediately neighboring channel upstream. Output grooves, being adjacent to the input grooves, extend in the surface of the module with output groove openings beginning within the helically cut channel and terminating in a dead end before intersecting the immediately neighboring channel downstream. A barrier or land is between the pair of adjacent output and input grooves to prevent direct communication therebetween and to create a shearing effect of material passing thereover.

Although a plurality helix cut paths of both input and output grooves are employed in the preferred embodiment of the instant inventive module, it is also within the scope of the invention to use one path of discontinuous helix cut input and output grooves. Also, the clearance between the inner wall of the plasticating barrel and barriers between input and output grooves of the instant invention may be adjusted and/or varied as dictated by operating conditions.

In summary, the helically cut channel traversing in a reverse helical direction in the present invention allows for the back flow of molten material which is recycled therethrough. Also, input and output grooves cooperate with the barriers therebetween to enhance shearing and turbulent flow as pressure from the prior upstream stage forces plastic through the special module and into the next conveyor stage.

In terms of the method, the present invention relates to plasticating resinous material in a molten state under pressure by feeding resinous material in a solid state to the feed section of a screw plasticating device, such as an extruder or injection molding machine. As the screw is rotated in a cylindrical barrel having an inner surface, the flight of the screw and the inner surface cooperate to force and move resin material along a helical path forward toward the outlet port. In the transition section, heat is applied to the barrel which transfers to the material while working the material between the barrel and the screw. As a result of heat and mixing, the material is converted into a molten state.

To enhance mixing and melting, the instant invention uses a special cylindrical module included in the plasticating screw arrangement. More specifically, the instant cylindrical module has a helically cut channel traversing in a reverse helical direction, as compared with the forward direction of the flight in the prior stage. Input grooves and output grooves extend in the surface of the special cylindrical module with barriers therebetween as previously described, for creating turbulent flow, mixing, shearing and recyling of material therethrough.

Many other objects and features of the present invention will be obvious to those of skill in the art upon contemplation of the entire disclosure herein in connection with the accompanying drawings.

DESCRIPTION OF THE DRAWINGS

It is to be understood, however, that the drawings are designed for the purpose of illustration only and not as a definition of the limits of the instant invention, for which reference should be made to the claims appended hereto. Other features, objects and advantages of this invention will become clear from the following more detailed description made with reference to the drawings in which:

DESCRIPTION OF THE PREFERRED EMBODIMENT

Figure 1:
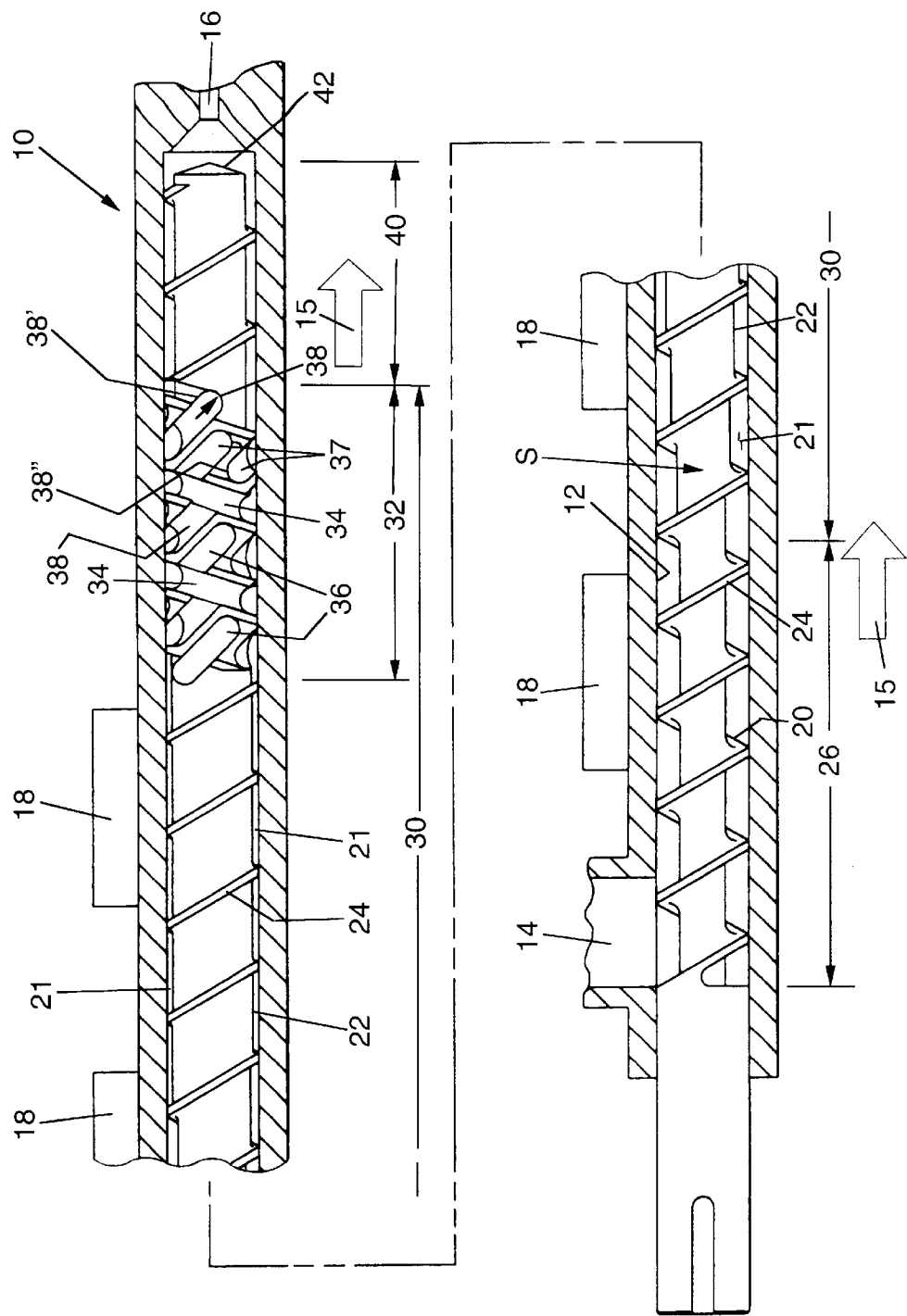
FIG. 1 shows a plasticating device or unit with a screw having the cylindrical module of the instant invention.

Referring to FIG. 1, a plasticating device is shown with a cylindrical barrel 10 having a cylindrical inner lining surface or wall 12. The barrel 10 has an inlet port 14 for the admission of one or more thermoplastic resinous materials and any required additives or agents. The barrel 10 is also provided with a discharge port 16 for the discharge of molten extrudate or material. Any conventional heating means 18 can be provided on the outside of the barrel 10 to apply heat to the barrel 10.

Within the barrel 10 is a screw S which is rotated by conventional means not shown. The screw S includes a helical flight 20 winding around a core 22, typically in a right hand threaded direction. The flight 20 includes flight land 24 which moves in close cooperative proximity with the inner surface 12 of the barrel 10. The helical flight 20 disposed within and cooperating with an inner surface 12 of a heated barrel 10 forms a forwardly flowing channel. The axial distance between comparable points on adjacent flights or channels corresponds with the pitch and helix angle of the flight or channel.

The screw S includes a plurality of sections along its axial extent with each section being suited to attain a particular function. Ordinarily there is a feed section 26, a transition section 30 and a pumping or metering section 40, in series. The inlet port 14 is the rearmost part of the upstream feed section 26, and the discharge port 16 is endmost part of the downstream metering section 40.

The flight 20 defines a helical valley 21 bounded by flight 20, inner surface 12 of the barrel 10 and the surface of the core 22. The surface of the valley 21 on the core 22 is the root of the valley. The screw S includes a relatively deep root feed section 26 for the admission, heating and working of solid resin, a reduced depth in the transition section 30 to adapt to the reduced volume of resin due to the elimination of air spaces between the solid particles, and a relatively shallow root metering section 40 wherein the resin is optimally in a molten state. The screw S has a discharge cone or valve 42 employed at the downstream end of the metering section 40.

Figure 2:
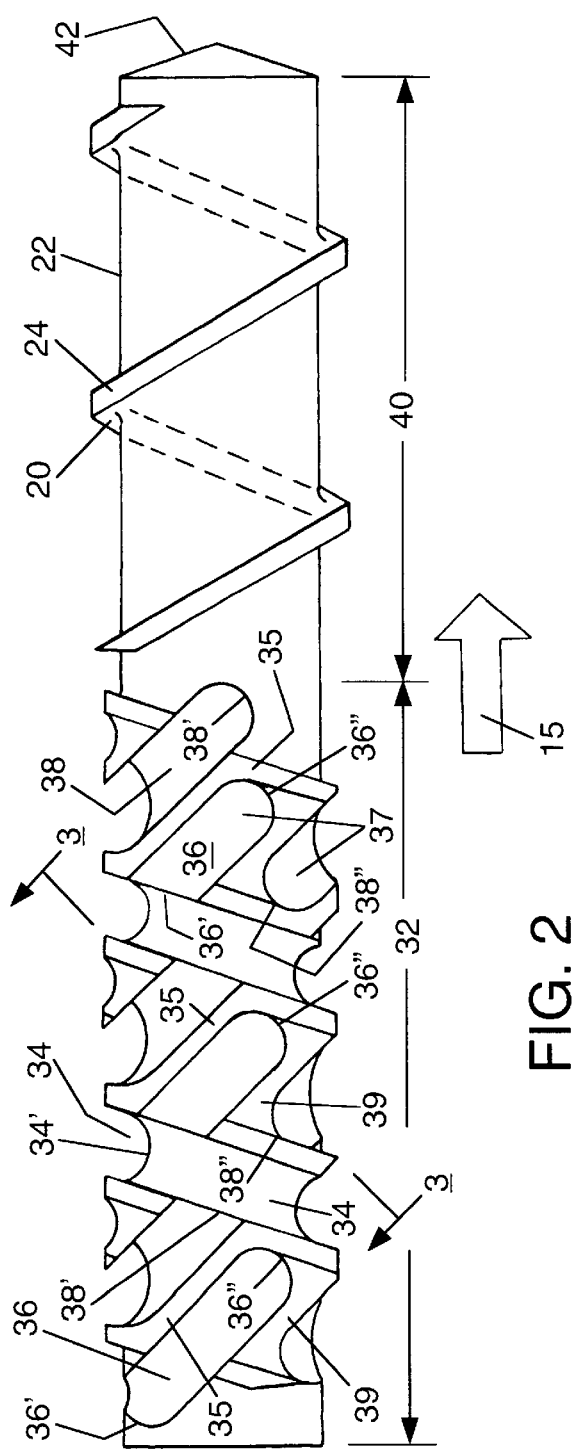
FIG. 2 shows an enlarged view of the cylindrical module in the transition section with the upstream metering section of the screw of FIG. 1.
Figure 3:
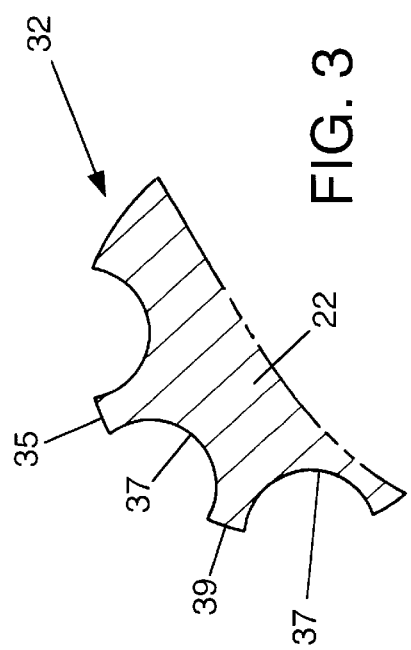
FIG. 3 is an enlarged cross-section of lines 3—3 of FIG. 2.

Referring to FIGS. 1 and 2 with specificity, in the final phase of the transition section 30 a special cylindrical apparatus or module 32 is adapted to be longitudinally mounted in the screw S. The special cylindrical module 32 includes a helically cut channel 34 having a depth 341. The helically cut channel 34 traverses in a left hand or reverse helical direction, as compared with the helical direction of the flight 20 of the screw S. Between the spiral path of the helically cut channel 34, input grooves 36 are arranged in a right hand helical pattern with each input groove 36 having an input groove opening 36' beginning in the helically cut channel 34 and terminating in a dead end 361' immediately before intersecting the adjacent helically cut channel 34 upstream in the longitudinal direction of the screw S. Like the input grooves 36, output grooves 38 are arranged to form a helical pattern and each output groove 38 has an output groove opening 38' beginning in the helically cut channel 34 and terminating in a dead end 38' immediately before intersecting the adjacent helically cut channel 34 downstream in the longitudinal direction. Each output groove 38 is paired in a substantially parallel adjacent relationship with one of the input grooves 36 forming an input and output groove pair 37. Generally, the helix angle of the input and output grooves may be between from 20° to 50° (right hand), with the preferred angle being approximately 35°. Although a plurality of helix cut paths of paired input and output grooves 37 are shown in the preferred embodiment of the instant invention, it is also within the scope of the invention to use just one path of discontinuous helix cut input and output groove pairs 37 passing therethrough.

Figure 4:
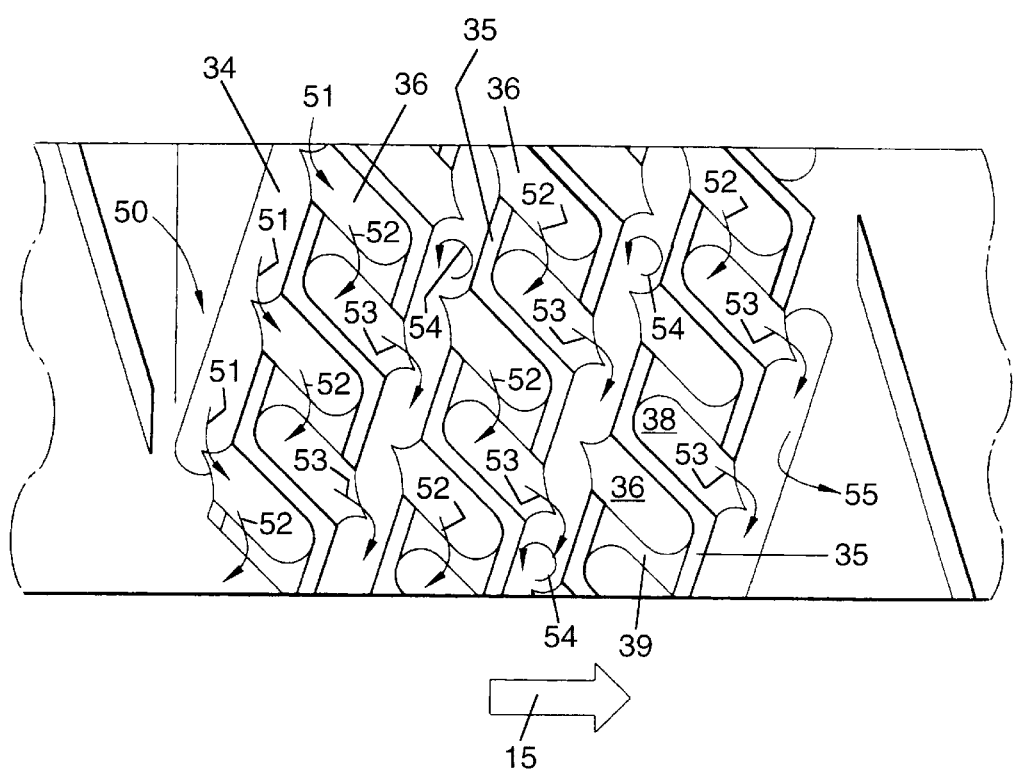
FIG. 4 illustrates the backward flow occurring in the cylindrical module and the forward tumbling, shearing and chaotic mixing action occurring between the input and outlet grooves over the barriers therebetween.

Barriers or lands 39 are arranged between or intermediate said paired input and output grooves, 36 and 38 respectively, to prevent said groove pairs 37 from easily communicating with one another. Each barrier 39 has a clearance with the inner wall 12 of the barrel 10 to allow restricted flow thereover 52, although the amount of clearance with the inner wall 12 and barriers 39 may be varied as dictated by operating conditions of the plasticating device. The sides of the input and output groove pairs 37 are framed with intermittent flights 35 having a Z-like shape, as best seen in FIGS. 2 and 4. The intermittent flights 35 move in close proximity with the inner surface 12 of the barrel so that flow of material is directed through input and output groove pairs 37, by passing over the pairs 37 respective barrier 39, and/or down helically cut channel 34.

The width of the helically cut channel 34 is preferably about equal to the widths of the input and output grooves, 36 and 38 respectively, although the width of the input and output grooves may vary between 0.5 to 5 times the width of the helical cut channel 34 to better accommodate the select thermoplastic resins and additives. Also, the depth of the helically cut channel 34 is preferably uniform throughout, and the angle of the helically cut channel 34 is preferable equal, although left hand or reverse to the helix angle of helical flight 20 of the screw S. Generally, however, the helix angle may be from 10° to 60°, left hand.

FIG. 4 is a design diagram indicating the effect upon the molten resin caused by the special cylindrical module 32. First, however, it is important to understand the overall flow dynamics. Arrow 15, shown in FIGS. 1, 2 and 4, indicates the directional flow of the resin material caused by the rotation of the helical flight 20. In operation, solid thermoplastic resin material and additives are fed into the barrel 10 through the inlet port 14 and advanced along a forward helical path toward the outlet port 16. Heat applied to the barrel 10 while working the material between the barrel inner wall 12 and the screw S in the transition section 30 progressively changes the solid material to a combined solid-molten mixture and then, with the instant invention, ultimately to a completely molten and homogeneous mixture. Mixing and shearing is intensified in the final phase of the transition 30 with the cylindrical module 32 to assure that only a homogeneous molten material, with substantially uniform temperature, viscosity, color and composition, exits the metering section 40 through discharge port 16.

To describe in more detail, referring to FIG. 4, in the final phase of the transition section 30 the combined solid-molten mixture of resin material is forced into the cylindrical module 32 and passed therethrough by flowing in input grooves 36 and out output grooves 38, similar to but more simplistically shown in U.S. Pat. No. 3,486,192 to Le Roy. Unlike U.S. Pat. No. 3,486,192, however, the instant invention provides a forward pumping action since the input and output grooves, 36 and 38 respectively, are helical with intermittent flights 35. Simultaneously, the forward flow 50 is interrupted by the helically cut channel 34 creating back pressure in the reverse direction as indicated by directional flow arrows 53. As flow dynamics change therein, a flow pattern is achieved indicated by multiple directional flow arrows 51, 52, 53 and 54. Molten resin is repeatedly forced and advanced through input grooves 36, over barriers 39 and then out output grooves 38 before retracting upstream in the reverse direction away from the outlet port 16 via the helically cut channel 34. More specifically, back pressure in the helically cut channel 34 forces the molten resin in a reverse direction until it is again forced forward through other input and output groove pairs 37.

The repeated, yet progressive, forward and backward tumbling and massaging of the resin in the cylindrical module 32 imparts turbulence to an otherwise linear flow stream so that optimum mixing is achieved and only homogeneous molten material exits the module 32 and advances to the metering section 30, as indicated by flow arrows 55. As molten material is extruded by the screw through the discharge port 16, new material is added into the metering section 40 from the module 32.

In summary, the mixing within the cylindrical module 32 of the transition section 30 is enhances by redistributing molten material back through as hereinbefore described. It will thus be seen that a new and useful cylindrical module, screw, plasticating device and method have been illustrated and described. It will be apparent to those skilled in the art that various changes or modifications may be made to the invention without departing from the spirit thereof.

What is claimed is:

1. A screw of a plasticating device of the type having an axial length wherein particles of resinous material are introduced upstream through an inlet of a heated barrel having an inner-wall and advanced downstream towards an outlet, the screw comprising:

a helical flight to be disposed within and cooperate with the inner-wall of the heated barrel;

a cylindrical portion having a continuous helical channel with a depth, the helical channel traversing the axial length in a reverse helical direction as compared with the helical direction of said flight;

input grooves extending in the surface of the cylindrical portion with each input groove having an opening beginning in the helical channel and terminating in a dead end before intersecting the helical channel upstream from the input groove opening;

output grooves extending in the surface of the cylindrical portion with each output groove being adjacent to at least one of the input grooves, each output groove having an opening beginning in the helical channel and terminating in a dead end before intersecting the helical channel downstream from the output groove opening;

a barrier passing between adjacent input and output grooves to form paired grooves and to prevent the grooves from directly communicating with one another; and an intermittent flight that passes between adjacent paired grooves and substantially parallel with the helical channel.

2. The screw of claim 1 wherein the input grooves in the surface of the cylindrical portion are arranged to form a helical pattern.

3. The screw of claim 1 wherein the output grooves in the surface of the cylindrical portion are arranged to form a helical pattern.

4. The screw of claim 1 wherein the depth of the helical channel in the cylindrical portion is substantially uniform.

5. The screw of claim 1 wherein each barrier has a radial height forming a clearance with the inner-wall of the barrel and the radial height is substantially uniform.

6. A cylindrical module for a screw of a plasticating device, wherein the screw has a helical flight disposed within and cooperating with an inner-wall of a heated barrel, the screw having an axial length with an upstream section where material is fed into the plasticating device and a downstream conveyor section where material exits the plasticating device, the cylindrical module comprising:

an outer surface with a helical channel cut therein and traversing the axial length in a reverse helical direction as compared with the helical direction of the flight of the screw, the helical channel having a depth;

input grooves extending in the surface of the cylindrical module with each input groove opening beginning in and intersecting with the helical channel and terminating in a dead end before again intersecting the helical channel immediately upstream;

output grooves extending in the surface of the cylindrical module with each output groove being adjacent to at least one of the input grooves, each output groove having an opening beginning in and intersecting with the helical channel and terminating in a dead end before again intersecting the helical channel immediately downstream;

the outer surface of the cylindrical module forming barriers and intermittent flights, the barriers being between adjacent input and output grooves forming paired grooves, the barriers prevent the paired input and output grooves from directly communicating with one another; and the intermittent flights being substantially parallel with the helical channel before passing between adjacently paired grooves.

7. The cylindrical module of claim 6 wherein the depth of the helical channel is substantially uniform.

8. The cylindrical module of claim 7 wherein the input grooves are arranged to form a helical pattern.

9. The cylindrical module of claim 8 wherein the output grooves are arranged to form a helical pattern.

10. The cylindrical module of claim 9 wherein the barriers have a radial height to form a clearance with the inner-wall of the barrel and the radial height is substantially uniform.

11. A cylindrical module adapted to be longitudinally mounted in a screw of a plasticating device, wherein the screw has an upstream feed section, a downstream output section and a helical flight disposed within and cooperating with an inner-wall of a heated barrel to form a forwardly flowing channel, the cylindrical module comprising:

a helical channel having a depth and traversing longitudinally in a reverse helical direction as compared with the helical direction of the flight of the screw;

input grooves arranged to form a helical pattern with each input groove having an opening, each input groove opening beginning in the helical channel and terminating in a dead end before intersecting the immediately adjacent helical channel upstream in the longitudinal direction;

output grooves arranged to form a helical pattern with each output groove having an opening and being paired in an adjacent relationship to at least one of the input grooves, each output groove opening beginning in the helical channel and terminating in a dead end before intersecting the immediately adjacent helical channel downstream in the longitudinal direction;

barriers intermediate said paired input and output grooves to prevent said paired input and output grooves from directly communicating with one another; and intermittent flights having a Z-like shape being adjacent to the helical channel and passing between said input and output groove pairs.

12. A process of plasticating resinous material into a molten state under pressure, the process comprising the steps of:

a) feeding solid resinous material to a rotating screw in a barrel having a cylindrical inner surface, said screw having a helical flight with said flight cooperating with said inner surface to move said material along a forward helical path toward an outlet port;

b) applying heat to said barrel and said material while working the material between the barrel and the screw to convert the solid material to a solid-molten combination state;

c) mixing and shearing said solid-molten combination with a cylindrical apparatus to form a substantially homogeneous molten material having substantially uniform temperature, viscosity, color and composition, the cylindrical apparatus is adapted to be longitudinally mounted in the screw, the cylindrical apparatus comprising a helical channel having a depth and traversing longitudinally in a reverse helical direction as compared with the helical direction of the flight of the screw, input grooves arranged to form a helical pattern with each input groove having an opening, each input groove opening beginning in the helical channel and terminating in a dead end before intersecting the immediately adjacent helical channel upstream, the cylindrical apparatus further comprising output grooves arranged to form a helical pattern with each output groove having an opening and being paired in an adjacent relationship to at least one of the input grooves, each output groove opening beginning in the helical channel and terminating in a dead end before intersecting the immediately adjacent helical channel downstream, barriers intermediate said paired input and output grooves to prevent said paired input and output grooves from directly communicating with one another, and an intermittent flight following beside a portion of the helical channel and passing adjacent to said paired input and output grooves, the intermittent flight being in close proximity with the barrel so that flow of material passing through the cylindrical apparatus is directed through paired input and output grooves by passing over the pairs respective barrier; and d) metering said substantially homogeneous molten material though said outlet port.

* * * * *